United States Patent
Su et al.

(10) Patent No.: US 12,328,186 B2
(45) Date of Patent: Jun. 10, 2025

(54) METHOD FOR SIGNAL DETECTION, ELECTRONIC DEVICE, AND STORAGE MEDIUM

(71) Applicant: RDA MICROELECTRONICS (SHANGHAI) CO., LTD., Shanghai (CN)

(72) Inventors: Jingjing Su, Shanghai (CN); Liyun Luo, Shanghai (CN)

(73) Assignee: RDA MICROELECTRONICS (SHANGHAI) CO., LTD., Shanghai (CN)

( * ) Notice: Subject to any disclaimer, the term of this patent is extended or adjusted under 35 U.S.C. 154(b) by 351 days.

(21) Appl. No.: 17/800,353

(22) PCT Filed: Jun. 5, 2020

(86) PCT No.: PCT/CN2020/094673
§ 371 (c)(1),
(2) Date: Aug. 17, 2022

(87) PCT Pub. No.: WO2021/164148
PCT Pub. Date: Aug. 26, 2021

(65) Prior Publication Data
US 2023/0071506 A1    Mar. 9, 2023

(30) Foreign Application Priority Data
Feb. 19, 2020 (CN) .......................... 202010102949.8

(51) Int. Cl.
*H04L 1/00* (2006.01)
*H04L 7/04* (2006.01)

(52) U.S. Cl.
CPC ............ *H04L 1/0036* (2013.01); *H04L 7/042* (2013.01)

(58) Field of Classification Search
CPC ....... H04L 1/0036; H04L 1/20; H04L 1/0047; H04L 7/042; H04L 69/22; H04W 4/80
See application file for complete search history.

(56) References Cited

U.S. PATENT DOCUMENTS

| 2002/0075974 A1 | 6/2002 | Mill |
| 2018/0014266 A1 | 1/2018 | Chen |

(Continued)

FOREIGN PATENT DOCUMENTS

| CN | 1866310 A | 11/2006 |
| CN | 101355383 A | 1/2009 |

(Continued)

OTHER PUBLICATIONS

Wang Yongli, "A Method to detect S mode ADS-B preamble pulse", dated Dec. 31, 2018.

(Continued)

*Primary Examiner* — Jamal Javaid
(74) *Attorney, Agent, or Firm* — Raj S. Davé; Davé Law Group, LLC

(57) ABSTRACT

Embodiments of the disclosure disclose a method for signal detection, an electronic device, and a storage medium. The method includes: receiving a Bluetooth signal, obtaining a signal quality by performing signal detection on a preamble portion of the Bluetooth signal, and terminating signal detection on sync word portion or an access address portion of the Bluetooth signal on condition that the signal quality is not greater than a quality threshold.

20 Claims, 3 Drawing Sheets

(56) References Cited

U.S. PATENT DOCUMENTS

| | | | |
|---|---|---|---|
| 2018/0324829 | A1 | 11/2018 | Van Driest et al. |
| 2019/0190765 | A1 | 6/2019 | Murali et al. |
| 2019/0364504 | A1 | 11/2019 | Murali et al. |
| 2021/0007142 | A1* | 1/2021 | Bendlin ............ H04W 74/0816 |
| 2022/0330339 | A1* | 10/2022 | Siomina ................ H04W 36/04 |
| 2023/0071506 | A1* | 3/2023 | Su ........................ H04B 17/336 |

FOREIGN PATENT DOCUMENTS

| | | |
|---|---|---|
| CN | 107181540 A | 9/2017 |
| CN | 107231225 A | 10/2017 |
| CN | 107454555 A | 12/2017 |
| CN | 107707270 A | 2/2018 |
| CN | 108683625 A | 10/2018 |
| CN | 109474920 A | 3/2019 |

OTHER PUBLICATIONS

The first office action issued in corresponding CN application No. 202010102949.8 dated Dec. 3, 2020.

The second office action issued in corresponding CN application No. 202010102949.8 dated May 8, 2021.

Xie Qing, "An Improved Detective Method for OFDMA System SS Synchronization", dated Oct. 1, 2008.

Notice of allowance issued in corresponding CN application No. 202010102949.8 dated Aug. 19, 2021.

WIPO, International Search Report and Written Opinion for International Application No. PCT/CN2020/094673, Nov. 25, 2020.

The extended European search report issued in corresponding EP application No. 20920376.9 dated Jun. 28, 2023.

\* cited by examiner

METHOD FOR SIGNAL DETECTION, ELECTRONIC DEVICE, AND STORAGE MEDIUM

CROSS REFERENCE TO RELATED APPLICATION(S)

This application is a National Stage of International Application No. PCT/CN2020/094673, field Jun. 5, 2020, which claims priority to Chinese Patent Application No. 202010102949.8, filed Feb. 19, 2020, the entire disclosures of which are hereby incorporated by reference.

TECHNICAL FIELD

The disclosure relates to the field of communication, and in particular, to a method for signal detection, an electronic device, and a storage medium.

BACKGROUND

Bluetooth technology is an open global specification for data and voice wireless communication, and is a short-range wireless connection technology that creates communication environment for a fixed or mobile device based on a low-cost short-range wireless connection. In a Bluetooth system, after receiving a Bluetooth signal, a receiver performs automatic gain control (AGC), signal detection, and signal synchronization on the Bluetooth signal.

At present, the receiver performs signal detection on a synchronization (sync) word portion or an access address portion of the Bluetooth signal within a duration set by a timer, so as to perform signal synchronization on the Bluetooth signal, until the timer runs out. When the Bluetooth signal has a poor quality, the receiver is unable to successfully synchronize the Bluetooth signal. However, in this case, the receiver may still perform signal detection on the sync word portion or the access address portion within the duration set by the timer, which leads to waste of power consumption of the receiver.

SUMMARY

In a first aspect, embodiments of the disclosure provide a method for signal detection. The method includes: receiving a Bluetooth signal, obtaining a signal quality by performing signal detection on a preamble portion of the Bluetooth signal, and terminating signal detection on a synchronization (sync) word portion or an access address portion of the Bluetooth signal on condition that the signal quality is not greater than a quality threshold.

In a second aspect, embodiments of the disclosure provide an electronic device. The electronic device includes a receiver, a transmitter, a memory configured to store one or more instructions, a processor configured to execute the one or more instructions to: cause the receiver to receive a Bluetooth signal, obtain a signal quality by performing signal detection on a preamble portion of the Bluetooth signal, and terminate signal detection on a sync word portion or an access address portion of the Bluetooth signal on condition that the signal quality is not greater than a quality threshold.

In a third aspect, embodiments of the disclosure provide a computer storage medium. The computer storage medium stores one or more instructions configured to be executed by an electronic device to cause the electronic device to: receive a Bluetooth signal, obtain a signal quality by performing signal detection on a preamble portion of the Bluetooth signal, and terminate signal detection on a sync word portion or an access address portion of the Bluetooth signal on condition that the signal quality is not greater than a quality threshold.

BRIEF DESCRIPTION OF THE DRAWINGS

To describe technical solutions in embodiments of the disclosure or in the background more clearly, the following briefly introduces the accompanying drawings required for describing embodiments of the disclosure or the background.

DETAILED DESCRIPTION

The terms "first", "second", "third" and the like used in embodiments in the specification, the claims, and the accompany drawings of the application are used to distinguish similar objects rather than describe a particular order. In addition, the terms "include", "comprise", and "have" as well as variations thereof are intended to cover non-exclusive inclusion. For example, a process, method, system, product, or device including a series of steps or units is not limited to the listed steps or units, on the contrary, it can optionally include other steps or units that are not expressly listed or inherent to the process, method, product, or device. "And/or" means to select one or both of two objects it is connected to. For example, "A and/or B" refers to A, B, or A+B.

Embodiments of the disclosure provides a method for signal detection. To describe solutions of the disclosure more clearly, some knowledge of Bluetooth signals is introduced first.

Bluetooth technology is a short-range wireless technology that supports a variety of network topologies, including point-to-point, broadcast, and mesh networks. Bluetooth technology brings convenience for short-distance wireless connection and transmission between electronic devices, and makes our devices such as a mobile phone, a tablet, a laptop, a camera, and various other digital products more connected. Bluetooth wireless technology is currently classified into two types, i.e., Bluetooth basic rate (BR)/enhance data rate (EDR) and Bluetooth low energy (BLE), where Bluetooth BR/EDR is used for audio and streaming media applications and creates one-to-one communication between devices based on a peer-to-peer network topology, and BLE is often used for battery-operated sensor devices and adopts a variety of network topologies, such as a point-to-point (one-to-one) network topology, a broadcast (one-to-many) network topology, a mesh (many-to-many) network topology, etc.

Figure 1:
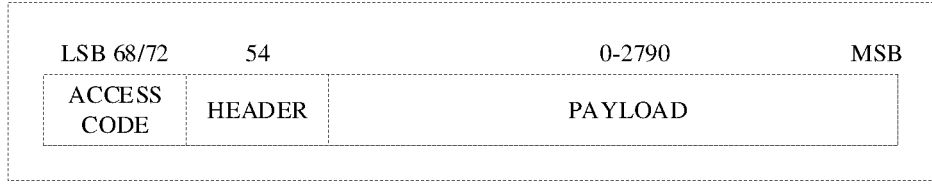
FIG. 1 is a schematic diagram of a format of a BR-type packet provided in embodiments of the disclosure.
Figure 2:
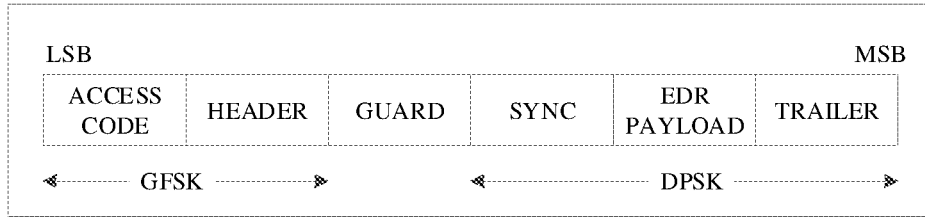
FIG. 2 is a schematic diagram of a format of an EDR-type packet provided in embodiments of the disclosure.
Figure 3:
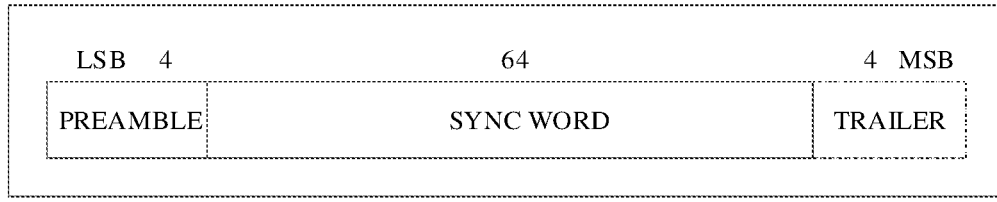
FIG. 3 is a schematic diagram of a format of an access code provided in embodiments of the disclosure.

FIG. 1 is a schematic diagram of a format of a BR-type packet provided in embodiments of the disclosure. As illustrated in FIG. 1, the BR-type packet includes an access code, a header, and a payload. FIG. 2 is a schematic diagram of a format of an EDR-type packet provided in embodiments of the disclosure. As illustrated in FIG. 2, the EDR-type packet includes an access code, a header, a guard, a synchronization (sync), an EDR payload, and a trailer. The access code in the BR-type packet and the access code in the EDR-type packet both have a format as illustrated in FIG. 3. The access code includes a preamble and a sync word. The access code may further include a trailer.

Figure 4:
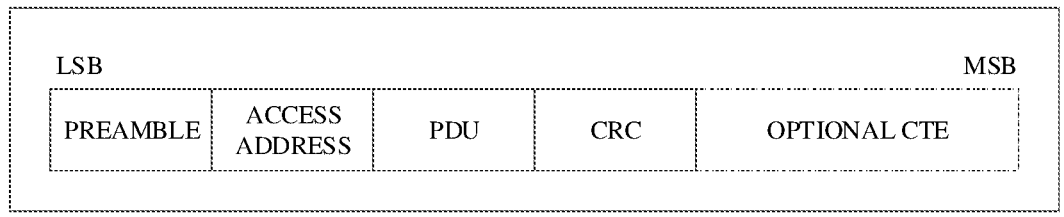
FIG. 4 is a schematic diagram of a format of a BLE packet provided in embodiments of the disclosure.
Figure 5:
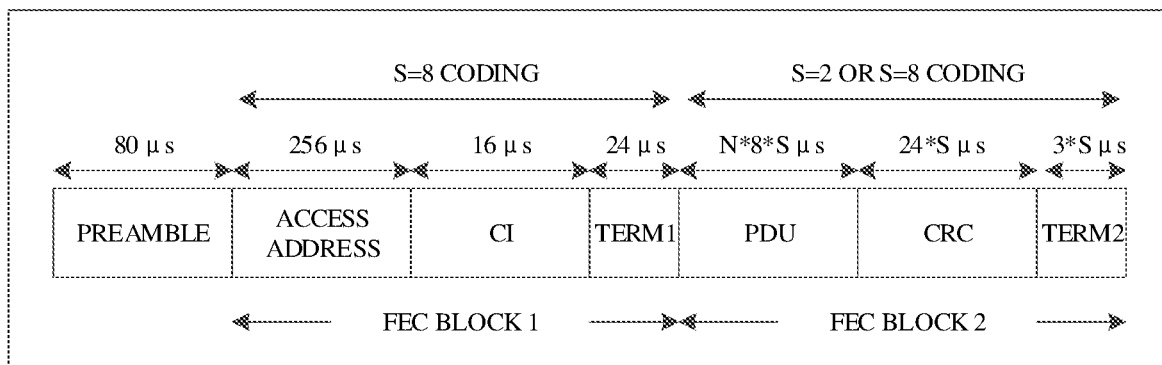
FIG. 5 is a schematic diagram of another format of a BLE packet provided in embodiments of the disclosure.

FIG. 4 is a schematic diagram of a format of a BLE packet provided in embodiments of the disclosure. The format of the BLE packet is a packet format of a low energy (LE) uncoded physical layer (PHY) in a Bluetooth protocol. The packet illustrated in FIG. 4 includes a preamble, an access address, a protocol data unit (PDU), and a cyclic redundancy check code (CRC), and may further include an optional constant tone extension (CTE). FIG. 5 is a schematic diagram of another format of a BLE packet provided in embodiments of the disclosure. The format of the BLE packet is a packet format of a LE coded PHY in the Bluetooth protocol. The packet illustrated in FIG. 5 includes a preamble, an access address, characteristic information (CI), a PDU, terminal 1 (TERM1), terminal 2 (TERM2), and a CRC.

As illustrated in FIGS. 1-5, a least significant bit (LSB) of a Bluetooth packet is located in the preamble. In a Bluetooth system, a transmitter first transmits a preamble portion of a Bluetooth signal, and then transmits a sync word portion or an access address portion of the Bluetooth signal. After detecting the Bluetooth signal, a receiver performs AGC adjustment, signal detection, and signal synchronization on the Bluetooth signal. At present, usually, AGC adjustment is performed on the Bluetooth signal based on the preamble of the Bluetooth signal, and signal detection is performed on the access address or the sync word of the Bluetooth signal, so as to perform signal synchronization on the Bluetooth signal. The receiver is provided with a timer, and after the timer starts timing, the receiver performs signal detection on the access address or the sync word, until the timing duration of the timer reaches a preset value. When the Bluetooth signal has a poor signal quality, the receiver is unable to successfully synchronize the Bluetooth signal by performing signal detection on the access address or the sync word. However, the receiver still performs signal detection on the access address portion or the sync word portion of the signal, which leads to unnecessary power consumption and waste of power consumption of the receiver.

In a communication system, signal synchronization is important. After a long time of data transmission, a receiving end needs to re-determine a start point of the data. Since a sampling clock and a carrier frequency of the receiving end do not match with a transmitting end, the receiving end needs to perform carrier and sampling clock compensation on the data. Accurate recovery of received data is not possible without accurate synchronization. There are many algorithms for synchronization estimation. For a system using a local signal for synchronization, including a Chinese digital television terrestrial standard (GB 20600-2006) receiver synchronization system, frame synchronization is generally achieved by performing signal correlation between a received signal and a local signal and determining a correlation peak from obtained correlation values. The signal receiving end determines the start position of the data based on the position of the correlation peak and completes synchronization of the sampling clock. The correlation peak is important in the synchronization system, and performance of a synchronization result depends on stability and reliability of the correlation peak.

A method for signal detection provided in embodiments of the disclosure will be described in detail below.

Figure 6:
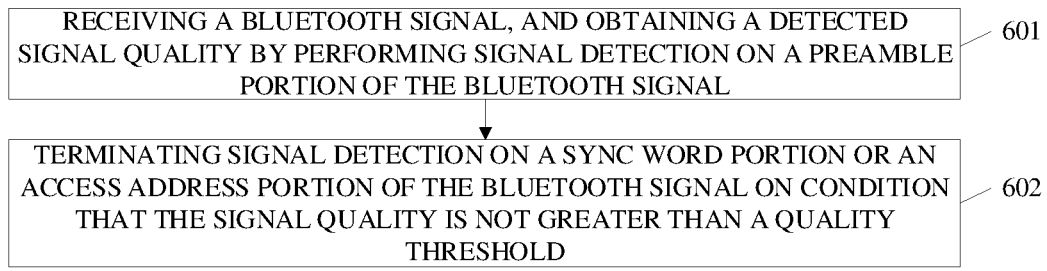
FIG. 6 is a flowchart of a method for signal detection provided in embodiments of the disclosure.

FIG. 6 is a flowchart of a method for signal detection provided in embodiments of the disclosure. As illustrated in FIG. 6, the method may include the following.

601. Receive a Bluetooth signal, and obtain a detected signal quality by performing signal detection on a preamble portion of the Bluetooth signal.

A receiver in a Bluetooth system receives the Bluetooth signal, and obtains the detected signal quality by performing signal detection on the preamble portion of the Bluetooth signal. It can be understood that, the detected signal quality is a signal quality of the preamble portion of the Bluetooth signal.

It should be noted that, the receiver in the Bluetooth system is a communication apparatus in the Bluetooth system. The communication apparatus may function as a receiver to receive a Bluetooth signal. Optionally, the communication apparatus may also function as a transmitter in the Bluetooth system to transmit a Bluetooth signal.

Optionally, after detecting that there is a Bluetooth signal for transmission, the receiver receives the Bluetooth signal and obtains the detected Bluetooth signal by performing signal detection on the preamble portion of the Bluetooth signal. After receiving a carrier, the receiver determines that there is a Bluetooth signal for transmission. It should be noted that, before receiving the preamble portion of the signal, the receiver may first receive the carrier. After determining that the carrier is received, the receiver starts to receive the preamble portion of the Bluetooth signal.

In optional implementations, the receiver receives the Bluetooth signal, and performs signal detection on the preamble portion of the Bluetooth signal within a first duration. In some embodiments, the receiver receives the Bluetooth signal, and performs signal detection on the preamble portion of the Bluetooth signal within the first duration as follows. The receiver sets a first timer, and starts the first timer after determining that there is a Bluetooth signal for transmission. On condition that a timing duration of the first timer does not exceed a first duration, the receiver receives the Bluetooth signal, and performs signal detection on the preamble portion of the Bluetooth signal. A value and a measurement unit of the first duration can be determined according to a reception duration of the preamble portion of the Bluetooth signal, and specifically, can be adjusted according to an actual situation, which is not limited herein. The reception duration of the preamble portion depends on a length of the preamble.

In some embodiments, the receiver receives the preamble portion of the Bluetooth signal, and performs AGC adjustment on the Bluetooth signal based on the preamble portion.

602. Terminate signal detection on a sync word portion or an access address portion of the Bluetooth signal on condition that the signal quality is not greater than a quality threshold.

On condition that the Bluetooth signal includes a sync word, for example, on condition that the Bluetooth signal carries a BR-type packet or an EDR-type packet, if the receiver determines that the detected signal quality is not greater than the quality threshold, the receiver terminates signal detection on the sync word portion of the Bluetooth signal.

On condition that the Bluetooth signal includes an access address, for example, on condition that the Bluetooth signal carries a LE-type packet, if the receiver determines that the detected signal quality is not greater than the quality threshold, the receiver terminates signal detection on the access address portion of the Bluetooth signal.

According to the packet format of the Bluetooth signal illustrated in FIGS. 1-5, a length of the access address or the sync word is 2 to 16 times a length of the preamble. The receiver performs signal detection on the preamble portion of the signal, and terminates signal detection on the access address portion or the sync word portion of the signal when the detected signal quality is not greater than the quality threshold. In this way, the receiver can save at least half of the power consumption of the receiver for signal detection when performing signal detection on the access address portion or the sync word portion of the signal.

Embodiments of the disclosure provide a method, an apparatus, and a device for signal detection and a storage medium. By performing signal detection on a preamble portion of a Bluetooth signal, and terminating signal detection on the Bluetooth signal on condition that a detected signal quality is not greater than a quality threshold, signal detection on a sync word portion or an access address portion of the signal is reduced, thereby reducing power consumption.

Figure 7:
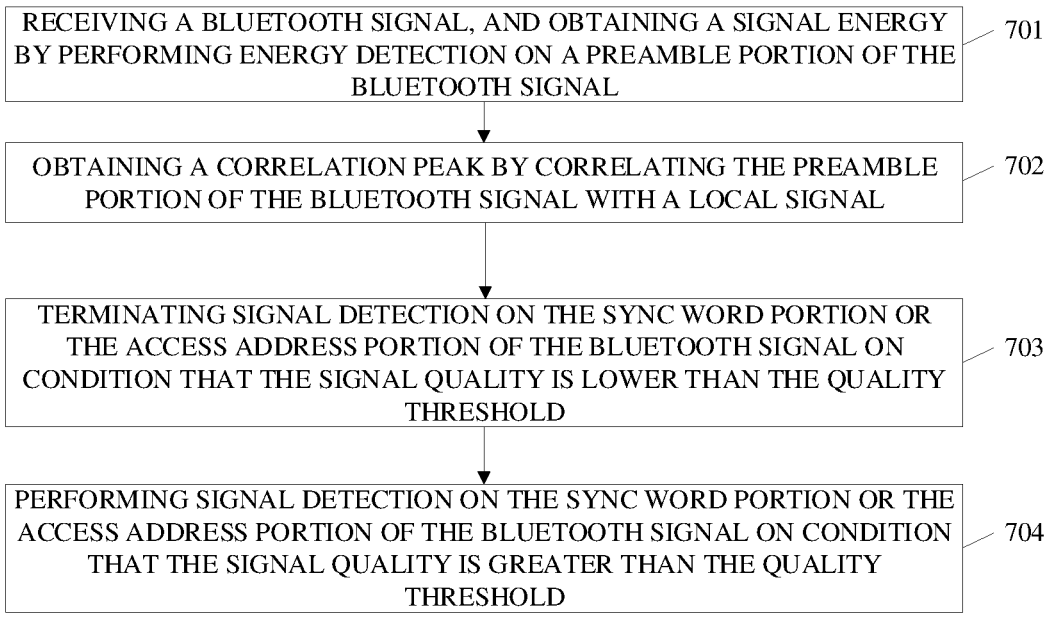
FIG. 7 is a flowchart of another method for signal detection provided in embodiments of the disclosure.

FIG. 7 is a flowchart of a method for signal detection provided in embodiments of the disclosure. This method is a further refinement of the method illustrated in FIG. 6 and may include the following.

701. Receive a Bluetooth signal, and obtain a signal energy by performing energy detection on a preamble portion of the Bluetooth signal.

The receiver receives the Bluetooth signal, and obtains the signal energy by performing energy detection on the preamble portion of the Bluetooth signal. It can be understood that, the obtained signal energy is a signal energy of the preamble portion of the Bluetooth signal.

Optionally, a received signal strength indicator (RSSI) of the preamble portion satisfies a condition of a first formula. The first formula is:

$$RSSI = \Sigma |sig_{receive}|^2 / sig_{length} - (\Sigma sig_{receive} / sig_{length})^2,$$

where $sig_{receive}$ is a signal strength of the preamble portion received by the receiver, and $sig_{length}$ is a signal length of the preamble portion of the Bluetooth signal.

702. Obtain a correlation peak by correlating the preamble portion of the Bluetooth signal with a local signal.

The local signal includes a preamble. The local signal is a signal generated by the receiver for correlation with a received signal. A correlation peak in a signal quality is a peak of multiple correlation values obtained by signal correlation between the preamble portion of the Bluetooth signal and the local signal.

Optionally, the local signal is obtained by Gaussian filtering. The local signal $sig_{local}$ satisfies a condition of a second formula. The second formula is:

$$sig_{local} = \text{local IQ signal} \otimes \text{Gaussian filter coefficient},$$

where Gaussian filter coefficient is a Gaussian filter coefficient, local IQ signal is a local in-phase quadrature (IQ) signal. The second formula indicates that the local signal is a convolution of the local IQ signal and the Gaussian filter coefficient.

Optionally, a correlation value R between the local signal and the Bluetooth signal satisfies a condition of a third formula.

The third formula is: $R = sig_{local} \otimes sig_{receive}$. $sig_{receive}$ is a received Bluetooth signal. In 702, the received Bluetooth signal is the preamble portion of the Bluetooth signal. The third formula indicates that the correlation value between the local signal and the Bluetooth signal is a convolution of the local signal and the Bluetooth signal.

703. Terminate signal detection on the sync word portion or the access address portion of the Bluetooth signal on condition that the signal quality is lower than the quality threshold.

The signal quality includes at least one of the signal energy or the correlation peak. The quality threshold includes at least one of an energy threshold or a correlation peak threshold.

In optional implementations, the receiver terminates signal detection on the sync word portion or the access address portion of the Bluetooth signal on condition that the signal energy is not greater than the energy threshold and/or the correlation peak is not greater than the correlation peak threshold.

The energy threshold and the correlation peak threshold are determined according to the signal energy of the Bluetooth signal and the correlation value with the local signal on condition that the receiver successfully synchronizes the Bluetooth signal, and can be adjusted according to an actual situation, which is not limited herein.

704. Perform signal detection on the sync word portion or the access address portion of the Bluetooth signal on condition that the signal quality is greater than the quality threshold.

In some embodiments, the receiver performs signal detection on the sync word portion or the access address portion of the Bluetooth signal on condition that the signal quality is greater than the quality threshold as follows. After starting to receive the sync word portion or the access address portion of the Bluetooth signal, the receiver starts a second timer. On condition that a timing duration of the second timer does not exceed a second duration, the receiver performs signal detection on the sync word portion or the access address portion of the Bluetooth signal. A value and a measurement unit of the second duration can be determined according to a reception duration of the sync word portion or the access address portion of the Bluetooth signal, and specifically, can be adjusted according to an actual situation, which is not limited herein.

On condition that the Bluetooth signal includes a sync word, for example, on condition that the Bluetooth signal carries a BR-type packet or an EDR-type packet, if the receiver determines that the detected signal quality is greater than the quality threshold, the receiver performs signal detection on the sync word portion of the Bluetooth signal.

On condition that the Bluetooth signal includes an access address, for example, on condition that the Bluetooth signal carries a LE-type packet, if the receiver determines that the detected signal quality is greater than the quality threshold, the receiver performs signal detection on the access address portion of the Bluetooth signal.

In some embodiments, on condition that the detected signal quality is equal to the quality threshold, the receiver may also perform signal detection on the sync word portion or the access address portion of the Bluetooth signal.

In optional implementations, the receiver obtains the correlation peak between the received signal and the local signal by performing signal detection on the sync word portion or the access address portion of the signal, and then performs signal synchronization on the Bluetooth signal according to the correlation peak between the received signal and the local signal. In these implementations, the received signal includes the sync word portion or the access address portion of the Bluetooth signal, and the local signal further includes a sync word or an access address.

Figure 8:
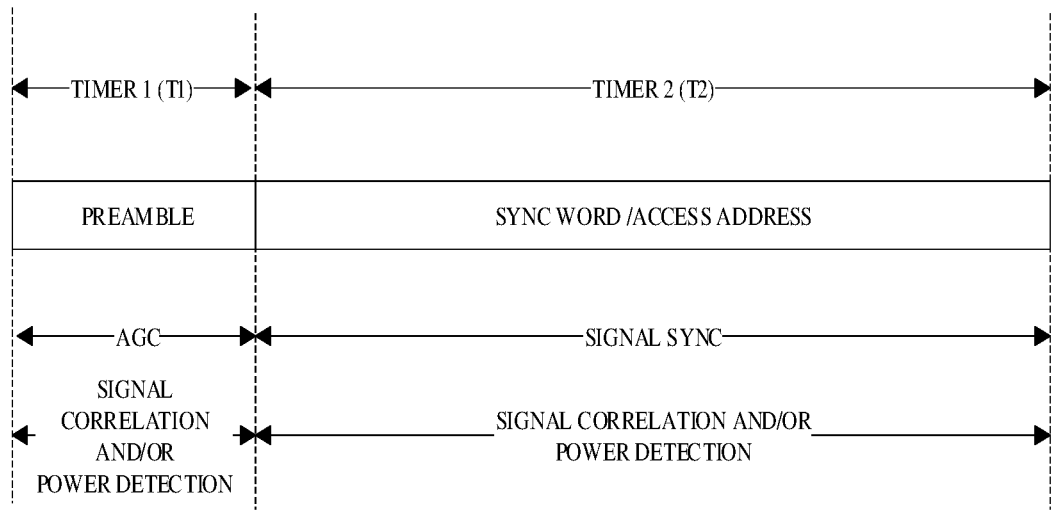
FIG. 8 is a timing diagram for signal detection provided in embodiments of the disclosure.

FIG. 8 is a timing diagram for signal detection provided in embodiments of the disclosure. In the timing diagram illustrated in FIG. 8, the receiver performs signal detection and AGC adjustment on the preamble portion of the Bluetooth signal within a first duration (t1) of a first timer (timer 1). The receiver performs signal detection on the sync word portion or the access address portion of the Bluetooth signal and signal synchronization within a second duration of a second timer (timer 2).

Embodiments of the disclosure provide a method, an apparatus, and a device for signal detection and storage a medium. By performing signal detection on a preamble portion of a Bluetooth signal, and terminating signal detection on the Bluetooth signal on condition that a detected signal quality is not greater than a quality threshold, signal detection on a sync word portion or an access address portion of the signal is reduced, thereby reducing power consumption.

Figure 9:
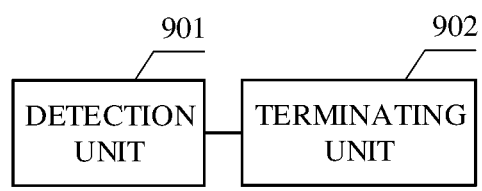
FIG. 9 is a schematic structural diagram of an apparatus for signal detection provided in embodiments of the disclosure.

FIG. 9 is a schematic structural diagram of an apparatus for signal detection provided in embodiments of the disclosure. The apparatus for signal detection in FIG. 9 corresponds to the receiver described above. As illustrated in FIG. 9, the apparatus for signal detection includes a detection unit 901 and a terminating unit 902. The detection unit 901 is configured to receive a Bluetooth signal, and obtain a detected signal quality by performing signal detection on a preamble portion of the Bluetooth signal. The terminating unit 902 is configured to terminate signal detection on a sync word portion or an access address portion of the Bluetooth signal on condition that the signal quality is not greater than a quality threshold signal.

In optional implementations, the detection unit 901 is specifically configured to receive the Bluetooth signal, and obtain the signal energy by performing energy detection on the preamble portion of the Bluetooth signal.

In optional implementations, the detection unit 901 is further configured to obtain the correlation peak by correlating the preamble portion of the Bluetooth signal with a local signal, where the local signal includes a preamble.

In optional implementations, the terminating unit 902 is specifically configured to terminate signal detection on the sync word portion or the access address portion of the Bluetooth signal on condition that the signal energy is not greater than the energy threshold and/or the correlation peak is not greater than the correlation peak threshold.

In optional implementations, the detection unit 901 is further configured to perform signal detection on the sync word portion or the access address portion of the Bluetooth signal on condition that the signal quality is greater than the quality threshold.

In optional implementations, the detection unit 901 is specifically configured to receive the Bluetooth signal, and obtain the detected signal quality by performing signal detection on the preamble portion of the Bluetooth signal within a first duration.

It should be understood that, division of modules of the above apparatus for signal detection is merely logical function division. During actual implementation, all or some of the modules may be integrated into one physical entity, or the modules may be physically separated. For example, the modules may be independently disposed processing elements, or may be integrated into a same chip for implementation. In addition, the modules may be stored in a storage element in a controller in a form of program code, and a processing element in a processor invokes and performs functions of the modules. In addition, the modules may be integrated together or may be independently implemented. The processing element may be an integrated circuit chip and has a signal processing capability. In an implementation process, steps in foregoing methods or foregoing modules can be implemented using a hardware integrated logical circuit in the processing element, or using instructions in a form of software. The processing element may be a general-purpose processor, for example, a central processing unit (CPU), or may be one or more integrated circuits configured to implement foregoing methods, for example, one or more application-specific integrated circuits (ASIC), one or more microprocessors (digital signal processor (DSP)), one or more field-programmable gate arrays (FPGA), etc.

Figure 10:
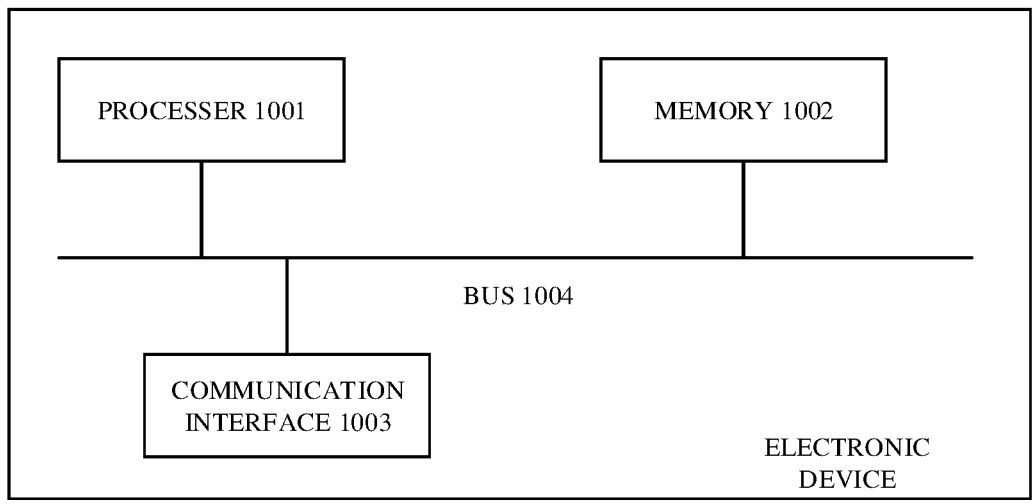
FIG. 10 is a schematic structural diagram of an electronic device provided in embodiments of the disclosure.

The following describes an electronic device provided in embodiments of the disclosure. Referring to FIG. 10, the electronic device includes a receiver 1001, a transmitter 1002, a processor 1003, and a memory 1004. There may be one or more processors 1003 in the electronic device 1000. One processor is used as an example in FIG. 10. In some embodiments of the disclosure, the receiver 1001, the transmitter 1002, the processor 1003, and the memory 1004 may be connected through a bus or in another manner. In FIG. 10, for example, the receiver 1001, the transmitter 1002, the processor 1003, and the memory 1004 are connected through the bus.

The memory 1004 may include a read-only memory and a random access memory, and provide instructions and data for the processor 1003. A part of the memory 1004 may further include a non-volatile random access memory (NVRAM). The memory 1004 stores an operating system and an operation instruction, an executable module or a data structure, a subset thereof, or an extended set thereof. The operation instruction may include various operation instructions to implement various operations. The operating system may include various system programs, to implement various basic services and process hardware-based tasks.

The processor 1003 controls operations of the electronic device 1000, and the processor 1003 may also be referred to as a CPU. In a specific application, all components of the electronic device 1000 are coupled together by using a bus system. In addition to a data bus, the bus system may further include a power bus, a control bus, a status signal bus, and the like. However, for clear description, various buses in the figure are referred to as the bus system.

The methods disclosed in foregoing embodiments of the disclosure may be applied to the processor 1003, or may be implemented by the processor 1003. The processor 1003 may be an integrated circuit chip and has a signal processing capability. In an implementation process, the steps in the foregoing methods may be completed by using a hardware integrated logic circuit in the processor 1003 or instructions in a form of software. The processor 1003 may be a general-purpose processor, a DSP, an ASIC, a FPGA or another programmable logic device, a discrete gate or a transistor logic device, or a discrete hardware component. The processor may implement or perform the methods, steps, and logical block diagrams that are disclosed in the embodiments of the disclosure. The general-purpose processor may be a microprocessor, or the processor may be any conventional processor or the like. The steps in the methods disclosed with reference to the embodiments of the disclosure may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1004, and the processor 1003 reads information in the memory 1004 and completes the steps in the foregoing methods in combination with hardware of the processor 1003.

The receiver 1001 may be configured to receive entered digital or character information, and generate signal input related to a related setting and function control of the electronic device 1000. The transmitter 1002 may include a display device such as a display, and the transmitter 1002 may be configured to output digital or character information through an external interface.

In embodiments of the disclosure, the processor 1003 is configured to perform the method for signal detection performed by the receiver.

In embodiments of the disclosure, a computer-readable storage medium is provided. The computer-readable storage medium stores a computer program. When executed by a processor, the computer program is configured to: receive a Bluetooth signal, and obtain a detected signal quality by performing signal detection on a preamble portion of the Bluetooth signal, terminate signal detection on a sync word portion or an access address portion of the Bluetooth signal on condition that the signal quality is not greater than a quality threshold.

The above is merely specific implementations of the application, but the protection scope of the application is not limited to this. Any variation or replacement readily figured out by a person skilled in the art within the technical scope disclosed in the application shall fall within the protection scope of the application. Therefore, the protection scope of the application shall be subject to the protection scope of the claims. Embodiments of the disclosure provide a method, an apparatus, and a device for signal detection and a storage medium.

By performing signal detection on a preamble portion of a Bluetooth signal, and terminating signal detection on the Bluetooth signal on condition that a detected signal quality is not greater than a quality threshold, signal detection on a sync word portion or an access address portion of the signal is reduced, thereby reducing power consumption.

In a first aspect, embodiments of the disclosure provide a method for signal detection. The method includes: receiving a Bluetooth signal, and obtaining a detected signal quality by performing signal detection on a preamble portion of the Bluetooth signal, and terminating signal detection on a sync word portion or an access address portion of the Bluetooth signal on condition that the signal quality is not greater than a quality threshold.

In an optional implementation, the signal quality includes a signal energy, and receiving the Bluetooth signal, and obtaining the detected signal quality by performing signal detection on the preamble portion of the Bluetooth signal includes: receiving the Bluetooth signal, and obtaining the signal energy by performing energy detection on the preamble portion of the Bluetooth signal.

In an optional implementation, the signal quality includes a correlation peak, and the method further includes: obtaining the correlation peak by correlating the preamble portion of the Bluetooth signal with a local signal, where the local signal includes a preamble.

In an optional implementation, the quality threshold includes at least one of an energy threshold or a correlation peak threshold, and terminating signal detection on the sync word portion or the access address portion of the Bluetooth signal on condition that the signal quality is lower than the quality threshold includes: terminating signal detection on the sync word portion or the access address portion of the Bluetooth signal on condition that the signal energy is not greater than the energy threshold and/or the correlation peak is not greater than the correlation peak threshold.

In an optional implementation, subsequent to receiving the Bluetooth signal, and obtaining the detected signal quality by performing signal detection on the preamble portion of the Bluetooth signal, the method further includes: performing signal detection on the sync word portion or the access address portion of the Bluetooth signal on condition that the signal quality is greater than the quality threshold.

In an optional implementation, receiving the Bluetooth signal, and obtaining the detected signal quality by performing signal detection on the preamble portion of the Bluetooth signal includes: receiving the Bluetooth signal, and obtaining the detected signal quality by performing signal detection on the preamble portion of the Bluetooth signal within a first duration.

In a second aspect, embodiments of the disclosure provide an apparatus for signal detection. The method includes a detection unit and a terminating unit. The detection unit is configured to receive a Bluetooth signal, and obtain a detected signal quality by performing signal detection on a preamble portion of the Bluetooth signal. The terminating unit is configured to terminate signal detection on a sync word portion or an access address portion of the Bluetooth signal on condition that the signal quality is lower than a quality threshold signal.

In an optional implementation, the detection unit is specifically configured to receive the Bluetooth signal, and obtain the signal energy by performing energy detection on the preamble portion of the Bluetooth signal.

In an optional implementation, the detection unit is further configured to obtain the correlation peak by correlating the preamble portion of the Bluetooth signal with a local signal, where the local signal includes a preamble.

In an optional implementation, the terminating unit is specifically configured to terminate signal detection on the sync word portion or the access address portion of the Bluetooth signal on condition that the signal energy is not greater than the energy threshold and/or the correlation peak is not greater than the correlation peak threshold.

In an optional implementation, the detection unit is further configured to perform signal detection on the sync word portion or the access address portion of the Bluetooth signal on condition that the signal quality is greater than the quality threshold.

In an optional implementation, the detection unit is specifically configured to receive the Bluetooth signal, and obtain the detected signal quality by performing signal detection on the preamble portion of the Bluetooth signal within a first duration.

In a third aspect, embodiments of the disclosure provide an electronic device. The electronic device includes a receiver, a transmitter, a processor configured to execute one or more instructions, and a computer storage medium storing the one or more instructions configured to be loaded by the processor and perform the method of the first aspect and an optional implementation of the first aspect.

In a fourth aspect, embodiments of the disclosure provide a computer storage medium. The computer storage medium stores one or more instructions configured to be loaded and by a processor and perform the method of the first aspect and an optional implementation of the first aspect.

Embodiments of the disclosure provide a method, an apparatus, and a device for signal detection and a storage medium. By performing signal detection on a preamble portion of a Bluetooth signal, and terminating signal detection on the Bluetooth signal on condition that a detected signal quality is not greater than a quality threshold, signal detection on a sync word portion or an access address portion of the signal is reduced, thereby reducing power consumption.

What is claimed is:

1. A method for signal detection, comprising:
receiving a Bluetooth signal;
obtaining a signal quality by performing signal detection on a preamble portion of the Bluetooth signal; and
terminating signal detection on a synchronization (sync) word portion or an access address portion of the Bluetooth signal on condition that the signal quality is not greater than a quality threshold;
wherein obtaining the signal quality by performing signal detection on the preamble portion of the Bluetooth signal comprises:
obtaining the signal quality by performing signal detection on the preamble portion of the Bluetooth signal within a first duration.

2. The method of claim 1, wherein the signal quality comprises a signal energy, and the method further comprises:
obtaining the signal energy by performing energy detection on the preamble portion of the Bluetooth signal.

3. The method of claim 1, wherein the signal quality comprises a correlation peak, and the method further comprises:
obtaining the correlation peak by correlating the preamble portion of the Bluetooth signal with a local signal, wherein the local signal comprises a preamble.

4. The method of claim 2, wherein the quality threshold comprises an energy threshold.

5. The method of claim 1, further comprising:
performing signal detection on the sync word portion or the access address portion of the Bluetooth signal on condition that the signal quality is greater than the quality threshold.

6. An electronic device, comprising:
a receiver;
a transmitter;
a memory configured to store one or more instructions; and
a processor configured to execute the one or more instructions to:
cause the receiver to receive a Bluetooth signal;
obtain a signal quality by performing signal detection on a preamble portion of the Bluetooth signal; and
terminate signal detection on a synchronization (sync) word portion or an access address portion of the Bluetooth signal on condition that the signal quality is not greater than a quality threshold;
wherein the signal quality comprises a correlation peak, and the processor is further configured to execute the one or more instructions to:
obtain the correlation peak by correlating the preamble portion of the Bluetooth signal with a local signal, wherein the local signal comprises a preamble.

7. A non-transitory computer storage medium storing one or more instructions configured to be executed by an electronic device to cause the electronic device to:
receive a Bluetooth signal;
obtain a signal quality by performing signal detection on a preamble portion of the Bluetooth signal; and
terminate signal detection on a synchronization (sync) word portion or an access address portion of the Bluetooth signal on condition that the signal quality is not greater than a quality threshold;
wherein the one or more instructions causing the electronic device to obtain the signal quality by performing signal detection on the preamble portion of the Bluetooth signal cause the electronic device to:
obtain the signal quality by performing signal detection on the preamble portion of the Bluetooth signal within a first duration.

8. The method of claim 3, wherein the quality threshold comprises a correlation peak threshold.

9. The method of claim 1, wherein the signal quality comprises a signal energy and a correlation peak, and the method further comprises:
obtaining the signal energy by performing energy detection on the preamble portion of the Bluetooth signal; and
obtaining the correlation peak by correlating the preamble portion of the Bluetooth signal with a local signal, wherein the local signal comprises a preamble.

10. The method of claim 9, wherein the quality threshold comprises an energy threshold and a correlation peak threshold, and the method further comprises:
terminating signal detection on the sync word portion or the access address portion of the Bluetooth signal on condition that the signal energy is not greater than the energy threshold and the correlation peak is not greater than the correlation peak threshold.

11. The electronic device of claim 6, wherein the signal quality further comprises a signal energy, and the processor is further configured to execute the one or more instructions to:
obtain the signal energy by performing energy detection on the preamble portion of the Bluetooth signal.

12. The electronic device of claim 11, wherein the quality threshold comprises an energy threshold.

13. The electronic device of claim 6, wherein the quality threshold comprises a correlation peak threshold.

14. The electronic device of claim 11, wherein the quality threshold comprises an energy threshold and a correlation peak threshold, and the processor is further configured to execute the one or more instructions to:
terminate signal detection on the sync word portion or the access address portion of the Bluetooth signal on condition that the signal energy is not greater than the energy threshold and the correlation peak is not greater than the correlation peak threshold.

15. The electronic device of claim 6, wherein the processor is further configured to execute the one or more instructions to:
perform signal detection on the sync word portion or the access address portion of the Bluetooth signal on condition that the signal quality is greater than the quality threshold.

16. The electronic device of claim 6, wherein the processor configured to obtain the signal quality by performing signal detection on the preamble portion of the Bluetooth signal is configured to:
- obtain the signal quality by performing signal detection on the preamble portion of the Bluetooth signal within a first duration.

17. The non-transitory computer storage medium of claim 7, wherein the signal quality comprises a signal energy, and the one or more instructions further cause the electronic device to:
- obtain the signal energy by performing energy detection on the preamble portion of the Bluetooth signal.

18. The non-transitory computer storage medium of claim 7, wherein the signal quality comprises a correlation peak, and the one or more instructions further cause the electronic device to:
- obtain the correlation peak by correlating the preamble portion of the Bluetooth signal with a local signal, wherein the local signal comprises a preamble.

19. The non-transitory computer storage medium of claim 7, wherein the signal quality comprises a signal energy and a correlation peak, and the one or more instructions further cause the electronic device to:
- obtain the signal energy by performing energy detection on the preamble portion of the Bluetooth signal; and
- obtain the correlation peak by correlating the preamble portion of the Bluetooth signal with a local signal, wherein the local signal comprises a preamble.

20. The non-transitory computer storage medium of claim 7, wherein the one or more instructions further cause the electronic device to:
- perform signal detection on the sync word portion or the access address portion of the Bluetooth signal on condition that the signal quality is greater than the quality threshold.

* * * * *